United States Patent [19]

Goldstein et al.

[11] Patent Number: 4,551,298

[45] Date of Patent: Nov. 5, 1985

[54] RADIATION MONITORING APPARATUS

[75] Inventors: Norman P. Goldstein, Murrysville, Pa.; Stephen A. Lane, Cockeysville, Md.

[73] Assignee: Westinghouse Electric Corp., Pittsburgh, Pa.

[21] Appl. No.: 382,434

[22] Filed: May 26, 1982

[51] Int. Cl.$^4$ ............................................. G21C 17/00
[52] U.S. Cl. ..................................... 376/245; 250/328
[58] Field of Search ................ 250/328, 364; 376/245, 376/254, 255, 153–155

[56] References Cited

U.S. PATENT DOCUMENTS 4,194,117 3/1980 Gross ................................. 250/328

FOREIGN PATENT DOCUMENTS 1001875 8/1965 United Kingdom .
1574642 9/1980 United Kingdom .

OTHER PUBLICATIONS

Westinghouse Engineer, Jan. 1972, vol. 32, pp. 2–8, Lane et al., "Radiation Monitoring System for Nuclear Power Plants".
"Radiation Monitoring—An Instrumentation System for Control of Radiation Hazards", Rastman et al., pp. 110–115.

Primary Examiner—Sal Cangialosi
Attorney, Agent, or Firm—C. M. Lorin

[57] ABSTRACT

The radioactivity of radioactive fluid is monitored, in the presence of background radiation, without interruption of radioactivity detection with two successive volumes of radioactive fluid, the background being eliminated by subtraction. Typically the intrinsic responses are in the ratio of two to one for such successive measurements, when the proper volumes have been selected.

24 Claims, 3 Drawing Figures

RADIATION MONITORING APPARATUS

BACKGROUND OF THE INVENTION

The invention relates to radiation monitoring, e.g. to systems for ascertaining intermittently or continuously the radiation level in installations such as a nuclear reactor. Radiation monitoring involves the use of radiation detectors placed at selected locations. Of all basic types of detectors, the present invention pertains to the "on-line" and/or "off-line" type of radioactive gas and/or liquid detector. See for instance—Westinghouse Engineer, January 1972, Vol. 32, pp. 2–8, "Radiation Monitoring System for Nuclear Power Plants" by S. A. Lane, C. Griesaker and T. Hamburger. Also "Radiation Monitoring—An Instrumentation System for Control of Radiation Hazards" by R. Eastman and D. M. Gallagher, IEEE Trans. Nuclear Sci. Vol. NS-12, No. 6, pp. 15–21 (December 1965).

Detection of radioactivity in a gas, or liquid, involves the combination of an on-line, or an off-line, volume of radioactive fluid and a detector of the radiation emitted by such a volume. However, such a detection most of the time is taking place in the presence of a significant background of radiation, which moreover may vary substantially. One of the precautions taken to subtract such background from the measurement has been to make an initial calibration of the detector. The intervening variations in the background level, however, will defeat the purpose. Shielding of the equipment is not satisfactory because effective shielding would be prohibitive in cost and weight.

Therefore, the problem is to obtain a true radioactivity measurement with radioactive fluid while accepting some sort of background information in the derived reading.

A number of approaches have been used in the past to solve this problem, but they all have failed because of serious drawbacks.

A first approach is to measure the background separately, using an auxiliary detector, e.g., a small counter disposed externally. This is not satisfactory because while the auxiliary detector is outside the normal shielding, the background radiation effect on the main monitor, as seen from inside the shielding, is much different from the one detected outside. This is particularly true with gamma rays, which are the radiation encountered in a nuclear reactor plant. Therefore, the outside counter will often give a false indication of the background counts seen by the monitor detector itself. Clearly, under these circumstances the compensation will not be effective.

A second approach consists in purging the detection monitoring system of the radioactive gas or liquid under detection, and measuring the background level separately with the main detector or counter. The main drawback in this case is the resulting interruption of the radiation measurement. Any rapid or continual increases in radioactivity release levels, which occur during these purging periods, will not be detected so that the opportunity for rapid corrective action in the plant may be missed.

SUMMARY OF THE INVENTION

The invention resides in deriving an indication of the radioactivity of a fluid in the presence of a common background of radiation by taking two independent measurements with two different volumes of said fluid to derive a first and a second count of radiation, respectively, and combining algebraically said first and second counts to derive an indication of fluid radioactivity which is substantially free from said common background information.

The invention is preferably conducted in two successive steps, which may be performed consecutively and/or cyclically. During the first step the volume of radioactive fluid is chosen so that the intrinsic response be as large as practical. During the second step the volume is chosen to be as small as possible while still allowing the detection of any change in fluid radioactivity intervening during such second step.

Typically, said intrinsic responses are in a ratio of two to one.

DESCRIPTION OF THE PREFERRED EMBODIMENT

Figure 1:
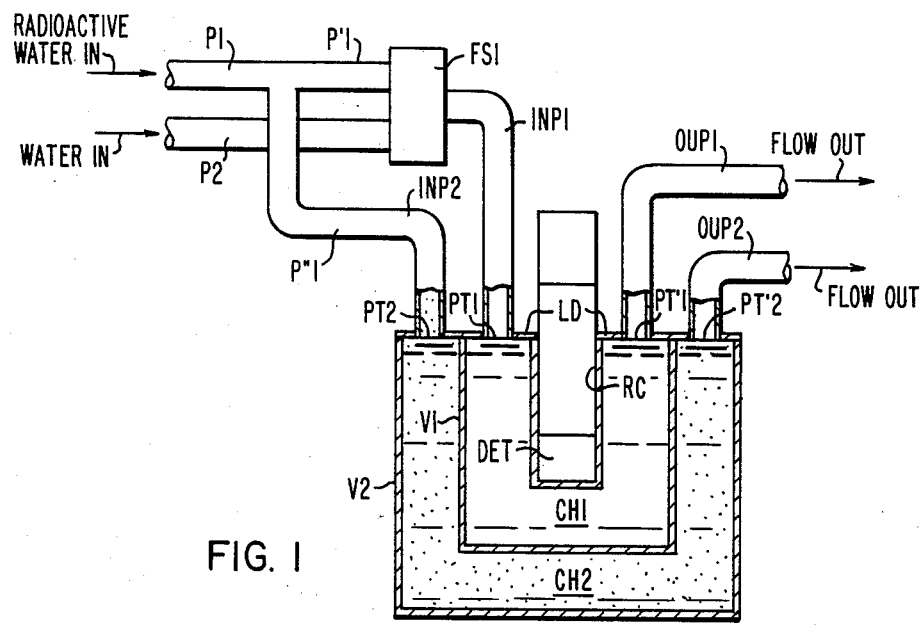
FIG. 1 shows a liquid monitoring according to the present invention.

The present invention rests upon an approach to background elimination in a radiation monitoring system which no longer requires interrupting the radiation measurement.

The invention resides in successively measuring two proportionate levels of radioactivity and in substracting one radioactivity measurement from the other in order to eliminate a common background level affecting both measurements.

This is achieved by measuring with a common radioactivity detector two different volumes of a sample of radioactive fluid. Indeed, this does not need to be done off-line, it can be accomplished on-line as well.

More specifically, a sampling chamber is first filled up with radioactive fluid, then, it is partially purged, e.g., partially filled with radioactive fluid, the radioactivity detector providing a response successively for each filling condition of the sampling chamber.

In accordance with another embodiment of the invention, two sampling chambers are juxtaposed, or concentrically related, in front of the radioactivity detector so that in one mode of operation both chambers are filled with radioactive fluid, and in a second mode only one is so filled. Preferably, one chamber is larger than the other, and still more specifically, the smaller one gives about one-half the response of the larger one.

In this respect, it is observed that maximum accuracy in the radioactivity measurement is obtained when the radioactivity level is measured with a chamber completely filled with radioactive fluid and when the background level is separately measured with the chamber completely filled with non-radioactive fluid, e.g., purged.

In accordance with the present invention, the background level is always detected by the monitor in the presence of radioactive fluid in the chamber. This is achieved first with a full volume of radioactive fluid, secondly with a minimal volume of radioactive fluid. Measurement of radioactivity with such minimal volume may become a problem for the detection of radioactivity level since the detector measures too weak an indicative level against the background level. Therefore, the residual volume of radioactive fluid should not be too much reduced. A compromise is reached, in accordance with the present invention, by making the minimal volume such that in the detector is derived about one-third the response for the full volume.

The advantage of the invention when it involves cycling back and forth between two such alternate modes, is that it will allow the activity and background to be determined with the monitor remaining functional and staying on the alert for any sudden changes in either the activity level or the background level.

This improvement stems from the observation that the ability of radiation monitoring to detect radioactivity of interest is limited by the background in the monitor. Present day monitors are constructed with reduced shielding. This, however, results in a moderately high background rate. The radioactive signal and background levels are separated by careful statistical analysis. This makes it necessary to perform an accurate background subtraction in order to obtain a measurement of sufficient accuracy.

There is also the complication arising from the fact that in a nuclear plant the background level tends to vary from day to day so that it is not sufficient to measure the background level once when the monitor is installed and to apply such result for all subsequent background levels in the subtractions. The variation in background level would require a purge of the monitor at least 2–3 times a day for the purpose of measuring the background response separately. The problem, with this approach, is that it may last as lone as 1–2 hours per day. If any radiation problem in the plant operations occurred during that period, the monitor would not be able to detect the emergency.

In order to overcome this drawback, it has been proposed to use a small auxiliary counter outside of the monitor shield to measure the strength of the background field, thereby to permit a more accurate background subtraction. This technique requires an initial calibration relating the signal in the external counter to the background in the monitor itself. It must be then assumed that such strict proportionality between the two signals remains after calibration.

There are a number of difficulties associated with this approach which detract from its reliability. First such an external counter has a different response as a function of gamma-ray energy than the counter used inside the monitor, because the latter is shielded while the former is not. Consequently, any change in the shape of the gamma ray spectrum will alter the relationship between the internal and external counters. For example, if the initial background field consists of $^{137}$Cs (0.662 MeV) and $^{60}$Co (1.17, 1.33 MeV) gammas, then, a certain relationship will initially be found between the reading of the external detector and the background rate of the detector in the monitor itself. If the background field doubles but retains the same spectral shape, then, the rate in both the external and internal counters will double, and correct background subtraction can be achieved by applying the initial calibration factor to the rate from the external counter. Should, however, some waste material emitting low energy radiation, say $^{57}$Co (0.122 MeV) be brought into the plant, low energy gamma rays will be readily detected by the external counter, but will not reach the main monitor counter because of the monitor shield. This will result in extra counts in the external counter indicating that the background has increased, a greater background subtraction is, then, required from the system. In fact, the main monitor background will not have changed and a substantial error would result in the system.

A second problem is associated with the use of an external counter which results from the buildup of "crud" inside the monitor. This can occur in a number of different ways depending on the monitors. For example, with the liquid monitor type some of the radioactive material in water can deposit in dead areas of the monitor. Also, with gas monitor type a small fraction of the noble gases can be absorbed into the material of the scintillation detector used in such case. Such buildup gives rise to a background rate the contribution of which is independent of the instantaneous activity concentration in the monitor at that time. In the case of the liquid monitor, the internal background will build up monotonically with time and eventually might overwhelm the background from external gamma rays. In the use of the radiogas monitor, the absorption effect will reach an equilibrium value in the presence of a steady-state noble gas activity and will change slowly if the gas activity changes. It is clear from this that the external counter will not be able to detect this type of background and the monitor system will not be able to correct for this type of effect.

Figure 2:
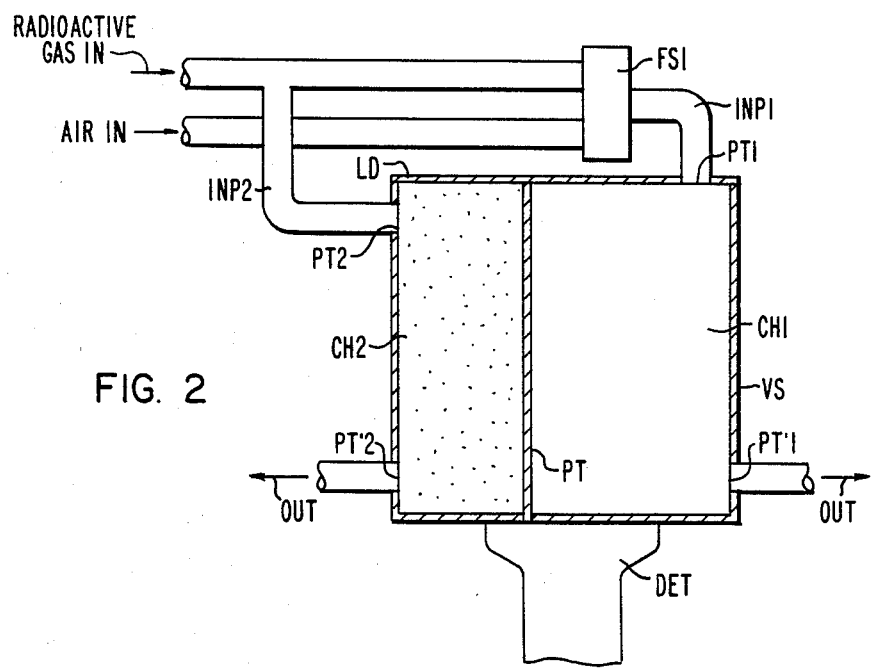
FIG. 2 shows a gas monitor according to the present invention.

Accordingly, the present invention provides a method of determining the background rate in any monitor without removing the monitor from operation and without the need for an external counter, thus, being free from spectrum shift and internal background problems associated with the external counter approach. Referring to FIGS. 1 and 2, typically the radiation monitoring system combines a radiation detector and two sections of fluid, liquid or gas, which divide the detection volume. Typically, the detection volume is divided into two sections, one representing about two-thirds of the total response and the other about one-third.

Referring to FIG. 1, a liquid monitor according to the present invention includes two chambers CH1, CH2, one contained in the other. A vessel V1 defining chamber CH1 is contained in a vessel V2 defining between V1 and V2 the chamber CH2. A lid LD closes the two vessels at the upper path. It is provided on one side with input ports PT2 for chamber CH2, PT1 for chamber CH1 and output ports PT'1 for chamber CH1 and PT'2 for chamber CH2 on the opposite side. Moreover, lid LD is provided centrally, thus at the center of chamber CH1, with a recess RC. Recess RC is defined so as to accommodate a detector DET. Thus, detector DET is exposed to radiation from radioactive liquid when chambers CH1 and/or CH2 contain such a liquid.

Radioactive water from a nuclear reactor powder plant is admitted through a pipe P1 which has two branches P'1, P''1. A flow switch FS1 is provided to allow on command the radioactive water from pipe P'1 into an input pipe INP1 leading to port PT1 of chamber CH1, whereas radioactive water from pipe P''1 flows through input pipe INP2 leading to port PT2 of chamber CH2. Alternately, non-radioactive water is admitted through a pipe P2 into flow switch FS1. Chamber CH1 is connected via port PT'1 with an output pipe OUP1, while chamber CH2 is connected via port PT'2 with an output pipe OUP2.

Control of switch FS1 under fluid pressure from pipes P1 and P2 will either allow radioactive water or nonradioactive water to flow into chamber CH1 during purging of this chamber. Usually radioactive water will flow through CH2 during both parts of the cycle, although it will also have to be purged in order to lower the "crud" build-up.

FIG. 2 shows a gas monitor which only differs from the liquid monitor of FIG. 1 in that the two chambers CH1, CH2 are juxtaposed both being contained in a common vessel VS with a common partition PT. Ports PT1, PT'1 of chamber CH1 are on one side of the vessel, namely the side of chamber CH1, whereas ports PT2, PT'2 of chamber CH2 are on the opposite side of the vessel. Illustratively, port PT1 is in the lid LD of vessel VS near the outside wall of CH1, and port PT2 is in the upper side of the opposite wall of vessel VS, e.g. the wall of chamber CH2. Output ports PT'1 and PT'2 are at the lower part of the vessel.

A scintillation detector DET is placed at the bottom of vessel VS facing both chambers CH1, CH2 and the fluid therein.

The vessels in FIGS. 1 and 2 may be cylindrical or rectangular as a matter of choice.

As shown illustratively, the volume of chamber CH1 is larger than the volume of chamber CH2. The closeness of chamber CH1 to detector DET in FIG. 1 and the area of exposure of the detector to chamber CH1 in FIG. 2 indicate a major contribution of chamber CH1 and a minor contribution of chamber CH2. Illustratively, the detection volume is divided in two sections CH1, CH2, such that CH1 represents about two-thirds of the total response and CH2 about one-third.

The plumbing is such that one of these chambers can be purged while the other retains the normal flow.

The operating procedure is then as follows. The flow of radioactive fluid travels through both chambers and is counted for a time $T_1$. Then the larger chamber CH1 is purged (with air for a radiogas monitor or water for a liquid monitor) while the normal flow is retained in the smaller chamber CH2. With the latter mode of operation the activity is counted for a time $T_2$. If one knows the counting efficiency of the two chambers, then, the two measurements provide two equations with two unknowns from which the activity concentration in the monitor can be determined.

To analyze the monitor performance, $E_1$ is defined as the counting efficiency of the larger chamber and $E_2$ the counting efficiency for the smaller chamber. Both are measured in CPM/$\mu$Ci/cc and the background rate is b in CPM. Then, for the first measurement the number of counts collected ($N_1$) in time $T_1$ will be $$N_1 = E_1 C T_1 + E_2 C T_1 + b T_1 \text{ cts} \tag{1}$$

and for the second measurement, e.g., during partial purge, the collected counts ($N_2$) in time $T_2$ will be $$N_2 = E_2 C T_2 + b T_2 \text{ cts} \tag{2}$$

By solving the two equations the background term b can be eliminated, giving the following expression for the measured activity.

$$C = \frac{\frac{N_1}{T_1} - \frac{N_2}{T_2}}{E_1} \tag{3}$$

For a given value of the ratio of the background to total signal, i.e., $b/(E_1 C + E_2 C)$ and of the response ratio relative to the primary and secondary chambers i.e., $E_2/E_1$, there is an optimum way to split the time between the total response, (i.e., Equation (1)) and the partial response given by Equation (2)). It follows that:

$$\frac{T_1}{T_2} = \sqrt{\frac{\left(1 + \frac{b}{(E_1 + E_2)C}\right)}{\left(\frac{E_2}{E_1 + E_2} + \frac{b}{(E_1 + E_2)C}\right)}} \tag{4}$$

It is also proposed to operate radiation measurement cyclically and alternately in the first and second mode as long as the background level is sufficiently large, for instance, above 10% of the measured radiation level. However, should the background level become so low as to allow full sensitivity measurement, then, radiation measurement will be conducted primarily in the first mode. Such low level of backgrounding for a single mode of operation, typically would be below 5% of the measured radiation level. Typical time ratios $T_1/T_2$ with the two-mode operative system according to the invention will be between 1 and 2.

Analysis of the system shows that one can always obtain a more accurate statistical determination of C if in the secondary count the measurement bears upon the background only, i.e., $E_2 = 0$. However, not making $E_2 = 0$ is a loss in accuracy which has to be accepted in order to allow the monitor to be always on the alert for any sudden changes in the fluid ratio activity to be measured. Therefore, the selection is made of an optimum value for $E_2/E_1$ representing a compromise between the desired maximum accuracy in determining C and the need to have a monitor active during a period of reduced response $E_2$. The best compromise, with the dimensional example given, requires that $E_2/E_1 = 0.5$, since for $E_2/E_1 < 0.5$ a better accuracy is obtained with a poorer detection capability for the period of reduced response $E_2$, while for $E_2/E_1 > 0.5$ the consequences are the opposite.

The characteristics of a system with $E_2/E_1 = 0.5$ are as follows if the background rate approximately equals the total signal rate, then, the statistical accuracy of the measured activity will be about 1.4 times poorer than if background alone were measured during the lower sensitivity period. In other words, if the monitor operating with a complete purge cycle possessed a standard deviation in the detected activity of 20%, when using the partial purge approach just discussed the resulting standard deviation would be 28%. Such moderate loss of accuracy, however, is worth the gain in capability since errors much larger than this can occur, should the background be incorrectly determined. Moreover, the monitor is still able to detect significant changes in activity level, even during the period of reduced response.

The monitor operation would involve cycling back and forth between the full and partial sensitivity modes while computing the activity and background associated with each pair. The counting rates in either mode can be monitored continuously to check for sudden large changes and should such a change occur, a determination of whether the background, the activity, or both, is responsible can be made by comparing the changes in the counts between the two modes.

The general monitor concept described herein provides a means of coping with changing external, or internal (i.e., crud build-up) background while retaining the ability to check for large changes in either activity or background. These extra capabilities are achieved at the cost of a moderate loss in statistical accuracy, or moderate increase in the time required to achieve a given accuracy.

Figure 3:
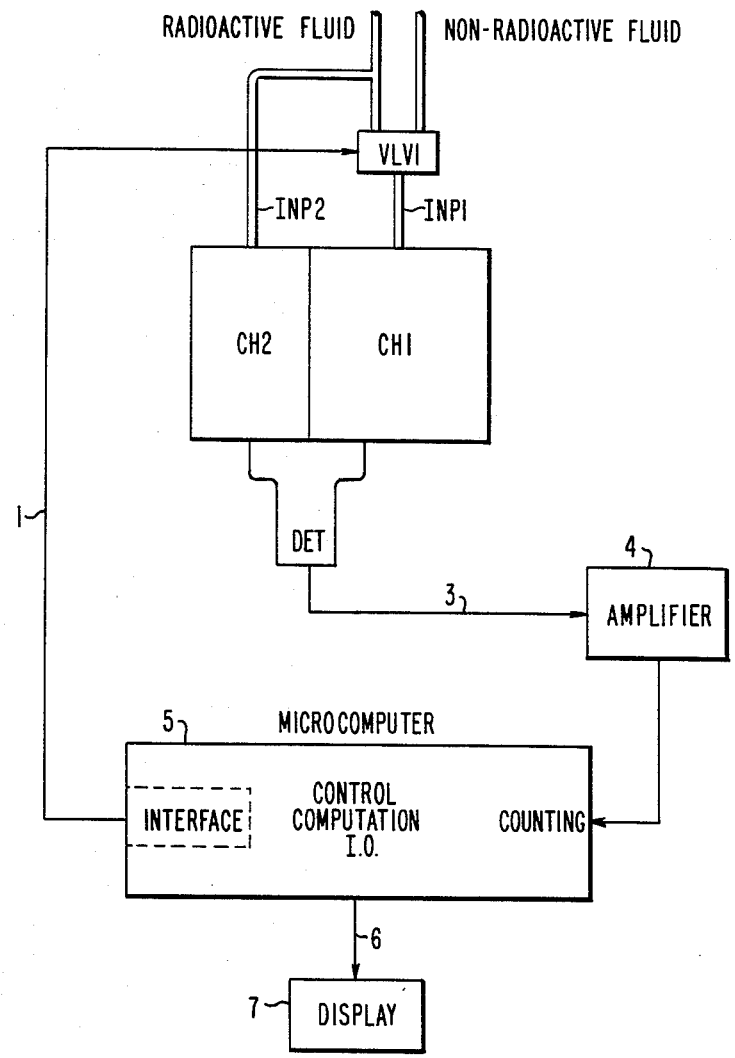
FIG. 3 is a radiation monitoring system embodying the radiation monitor of FIGS. 1 or 2.

Referring to FIG. 3, a radioactivity monitoring system embodying the monitor of FIG. 1 or of FIG. 2 is shown to include two chambers CH1, CH2 of inequal volume, CH1 being the major chamber, CH2 the minor chamber. A valve VLV1 allows radioactive fluid through input pipe INP1 to fill up chamber CH1 during one counting stage and allow the chamber to be purged during the second counting stage. The second chamber CH2, as shown, is allowed to receive only radioactive fluid, and it remains in such condition through both counting stages. A detector DET is exposed to radiation from chamber CH1 and/or chamber CH2. Exposure is during a time interval $T_1$ when chamber CH1 and chamber CH2 have both radioactive fluid, and during a time interval $T_2$ when chamber CH2 is the only one having radioactive fluid. The counting rate of the detector due to radioactivity in CH2 is typically about one-half that due to CH1. Detector DET is exposed to radioactive fluid during time intervals $T_1$ and $T_2$ which are in a proportion related to the relative responses of the two chambers and the ratio of the background to radioactivity counts.

Typically, assuming $E_2/E_1 \approx 0.5$ and the background counts equal to the counts from the radioactive fluid, $T_1/T_2$ would be about 1.3.

The number of counts during the time of exposure $T_1$, e.g., when both chambers have radioactive fluid, is denoted $N_1$. The number of counts is $N_2$ during the time interval $T_2$, e.g., when only chamber CH2 has radioactive fluid.

Counts from detector DET are inputted by line 3 into an amplifier 4, then, into a counting circuit pertaining to the microcomputer 5 which controls the operation of the monitor. Under control of the computer, the monitor operates in the first mode for a time $T_1$ with VLV1 allowing the flow of radioactive fluid into both CH1 and CH2. During this time interval, $N_1$ counts are collected from the detector. The computer, then, switches to the second mode in which the state of VLV1 is changed to allow the flow of non-radioactive fluid through CH1 while radioactive fluid still continues to flow through CH2. The second mode is maintained for a time $T_2$ during which $N_2$ counts are collected. These counts $N_1$ and $N_2$ can be described by the equations (1) and (2) stated earlier:

$$N_1 = E_1 C T_1 + E_2 C T_1 + b T_1 \quad (1) \text{ mode } \#1$$

$$N_2 = E_2 C T_2 + b T_2 \quad (2) \text{ mode } \#2$$

The computer calculates C from the two equations (1) and (2) and such radioactivity count C is provided as an output on line 6 and displayed by the display unit 7. Within the computer the calculated radioactivity C is used to actuate an alarm if a critical level, or a critical rate of increase, is exceeded.

We claim:

1. A radiation monitor system comprising two chambers and radiation detector means adapted to be responsive to radioactive fluid present in said chambers and to existing radioactive background; means being provided for comparing the responses of said radiation detector means in a first mode of operation when radioactive fluid is contained in at least one of said chambers and in a second mode of operation when radioactive fluid is contained in the other of said chambers, whereby information free from said radioactive background is derived from said comparing means.

2. The system of claim 1 with said adjoining chambers being laterally disposed to one another relative to said radiation detector means.

3. The system of claim 1 with a first of said adjoining chambers being superposed upon the second of said adjoining chambers as seen from said radiation detector means, said non-radioactive fluid being admitted in said second chamber in said second mode, and said radioactive fluid being admitted in both of said chambers in said first mode.

4. The system of claim 2 with said adjoining chambers exposing a different cross-section to said radiation detector means, said one chamber offering a smaller cross-section than said other chamber to said radiation detector means.

5. The system of claim 1 with said two chambers surrounding said radiation detector means in a concentric arrangement, said radioactive fluid being admitted into both said chambers in the first mode, with said radioactive fluid being admitted into said outer chamber and non-radioactive fluid into said inner chamber in the second mode; the system being alternately operated in the first and in the second modes.

6. The system of claim 5 with said outer chamber being such as to produce about half the response in said radiation detector as the response obtained with said inner chamber.

7. The system of claim 1 with said comparing means effecting a subtraction in the responses of said radiation detector means under said successive first and second modes, thereby to eliminate background level.

8. The system of claim 1 with said radiation detector means being a gamma radiation counter, and with the volume of said one and other chambers being in a ratio smaller than unity.

9. The system of claim 1 with said one and other chamber being of different size and having both radioactive fluid in said first mode; with said smaller chamber only having radioactive fluid in said second mode; and with said radiation detector means being operative during a first time interval in said first mode, during a second time interval in said second mode, said first and second time intervals being in a ratio in the range of about 1.5/1 (actually 1.3–2) to 2.

10. The system of any of claims 1 to 5 with said fluid being a radioactive liquid.

11. The system of any of claims 1 to 5 with said fluid being a radioactive gas.

12. The system of any of claims 1 to 5 with said detector means being one of a beta ray detector and a gamma ray detector.

13. A method of detecting the radioactivity of radioactive fluid in the presence of a background level of radiation, comprising the steps of:

measuring the radioactivity of a first volume $V_1$ of said fluid to derive a first radioactive count $N_1$ including background;

measuring the radioactivity of a second volume $V_2$ of said fluid to derive a second radioactive count $N_2$ including background; and subtracting one of said first and second counts from the other to derive an indication of fluid radioactivity which is free from background information.

14. The method of claim 13 with said first volume and said second volume measuring steps being effected cyclically and consecutively.

15. The method of claim 14 with said first volume $V_1$ being such as to maximize the first intrinsic response ($E_1$) to fluid radioactivity.

16. The method of claim 15 with said second volume $V_2$ being such as to provide a minimal second intrinsic response ($E_2$).

17. The method of claim 16 with said first intrinsic response $E_1$ being about twice said second intrinsic response $E_2$.

18. The method of claim 16 with said first count $N_1$ being derived during a time of exposure $T_1$ and said second count $N_2$ being derived during a time of exposure $T_2$, where $$N_1 = E_1CT_1 + E_2CT_1 + bT_1 \text{ and}$$

$$N_2 = E_2CT_2 + bT_2$$

with b being the intrinsic response to background radiation;

said subtracting step including the computation of C, as the radioactivity to be measured, according to the formula:

$$C = \frac{\frac{N_1}{T_1} - \frac{N_2}{T_2}}{E_1}$$

19. The method of claim 18 with $T_1$ and $T_2$ being selected according to the formula:

$$\frac{T_1}{T_2} = \sqrt{\frac{\left(1 + \frac{b}{(E_1 + E_2)C}\right)}{\left(\frac{E_2}{E_1 + E_2} + \frac{b}{(E_1 + E_2)C}\right)}} \qquad (4)$$

20. The system of claim 7 with means responsive to a background level exceeding a first predetermined level for cyclically operating said radiation detector means in said first and second modes, and with means responsive to a background level reaching below a second predetermined level for operating said radiation detector means primarily in said first mode.

21. The method of claim 14 with said first and second volume measuring steps being cyclically and alternately performed when said background level is above a first predetermined level, and said first volume measuring step is performed primarily when said background level falls below a second predetermined level.

22. The system of claim 1, with radioactive fluid being contained in both of said chambers when in said first mode and with radioactive fluid being contained in said other chamber when in said second mode.

23. The system of claim 1 with radioactive fluid being contained in said one chamber when on said first mode, in said other chamber when in said second mode.

24. The system of claim 1 with non-radioactive fluid being contained in a chamber in the absence of radioactive fluid, when operating in one of said modes.

* * * * *